G. C. WHITNEY.
MEANS FOR PRODUCING COLORED LIGHT EFFECTS.
APPLICATION FILED SEPT. 28, 1916.
1,223,459.
Patented Apr. 24, 1917.
2 SHEETS—SHEET 1.
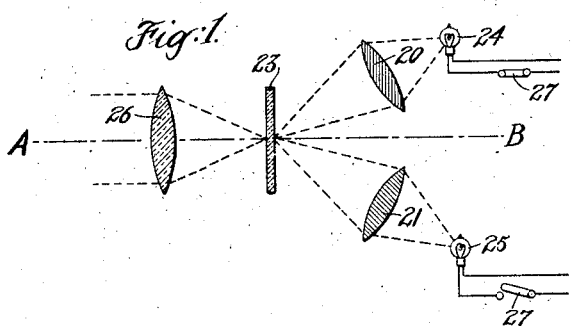
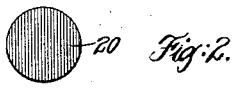
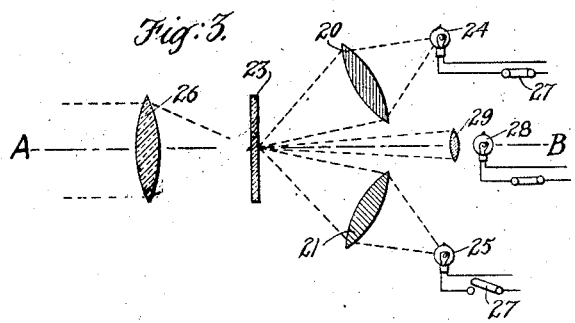
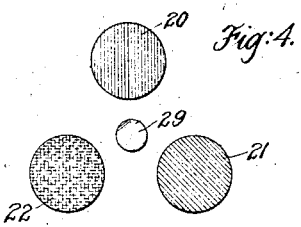
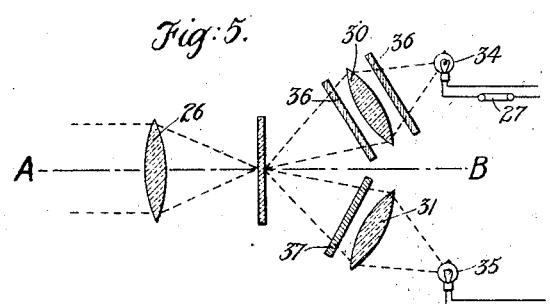
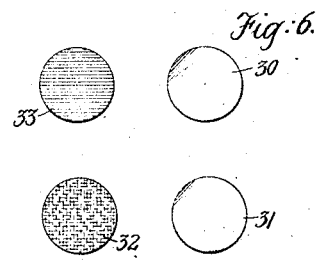
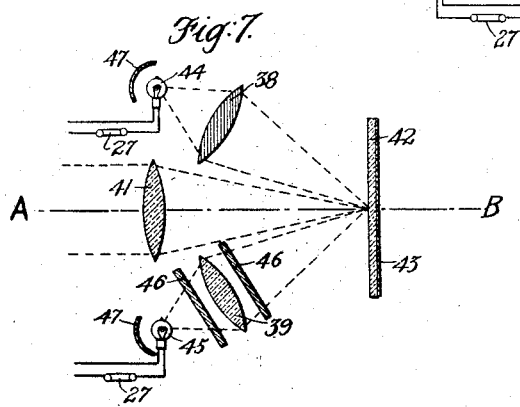
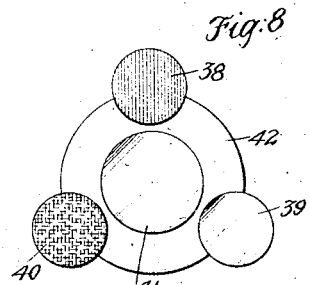
INVENTOR
Gilbert C. Whitney
BY Ralph K. Flint
ATTORNEY

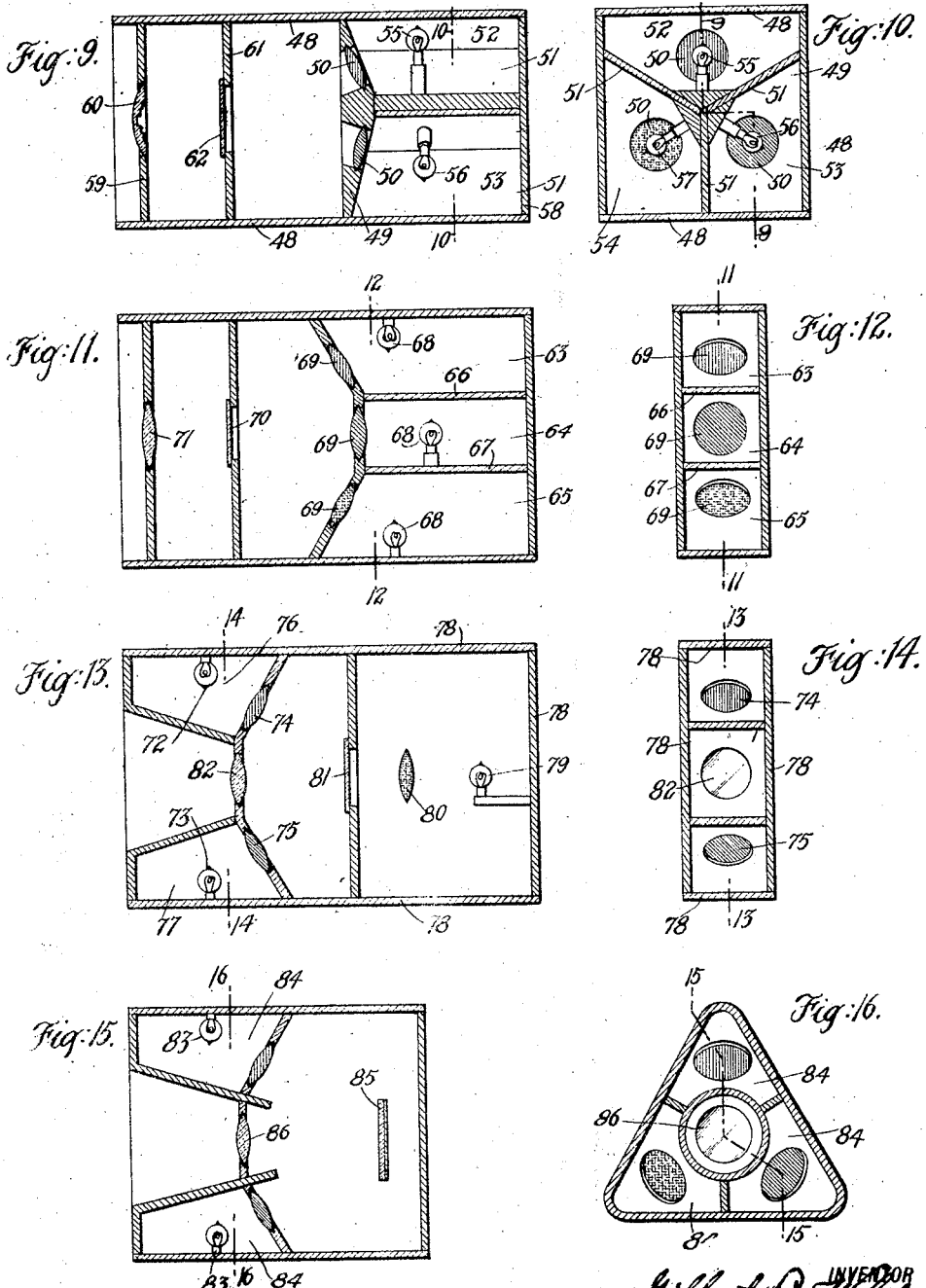

UNITED STATES PATENT OFFICE.

GILBERT C. WHITNEY, OF NEW YORK, N. Y.

MEANS FOR PRODUCING COLORED-LIGHT EFFECTS.

1,223,459.     Specification of Letters Patent.     Patented Apr. 24, 1917.

Application filed September 28, 1916. Serial No. 122,649.

*To all whom it may concern:*

Be it known that I, GILBERT C. WHITNEY, a citizen of the United States, and a resident of New York, in the county of New York and State of New York, have invented certain new and useful Improvements in Means for Producing Colored-Light Effects, of which the following is a specification.

My invention relates to the art of producing colored light effects by projecting a beam of colored light originating at one or more of a plurality of primary sources of light separate and distinct from one another, and each of a distinctive color, the projected beam being either of a definite color corresponding with the color of some one of said several primary sources, or a resultant color due to the mixing and blending of colored light emanating from two or more of said primary sources; and the object of my invention is to provide certain improvements in and relating to apparatus for producing colored light effects such as are above referred to, all as will hereinafter more fully appear.

The particular embodiment of my invention disclosed in this present application is designed to be used as the visible luminous signal light of a block signal system used upon railways, and to display signal lights of three colors such, for example, as red, yellow, and green; although the apparatus disclosed may be readily adapted to display or produce signal lights of two colors only, or of more than three colors. When so used my invention provides a signaling system in which signal lights of any one of two or more distinct colors, (as determined and controlled by the mechanical, electrical or pneumatic operating means for setting the signal lights of the system) may be made to appear separately and in proper sequence at one and the same point; the color of the light displayed indicating to the engineer or motorman the traffic conditions in the block or blocks ahead of him, as will be understood.

A further advantage incident to the use of my invention as a part of a railway signal system, and due to the fact that the colored lenses or disks which determine the color of the primary sources of light are so located and shielded that light emanating from an external source can not shine directly upon them, is that false or "phantom" signals cannot be produced.

The phenomena of false or "phantom" signals is frequently met with in signal systems wherein two or more colored lenses or disks are so located as to be exposed directly to light emanating from a powerful source such, for example, as the head-light of a passing locomotive, under which conditions the strong external source of light tends to neutralize, and in a sense to blot out the proper signal light. At the same time the light from the external source falls upon and is reflected from a lens or disk which should be invisible, because no light is being transmitted through it at the time and under the conditions assumed, thus causing the appearance of a somewhat dimmed light of the color of the lens or disk from which the external light is reflected and, obviously, of a color other than that which should be displayed.

In my invention, however, the effect of an intense beam of light from an external source falling upon the uncolored objective lens employed in my system can at most result in a mere dimming of the light passing through said lens; which dimming, however, can under no conditions be accompanied by the appearance of a light of a color different from that of the light which should properly appear; for the light from such external source can under no circumstances act upon an exposed but unilluminated colored lens or disk, because the colored lenses or disks are so located that light from an external source cannot reach them, as above explained.

With the above and other objects in view my invention consists in the improved means for producing colored light effects illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:

Figure 1 is a view employed to illustrate the optical principles of my invention;

Fig. 2 is a view showing the manner in which the colored lenses are spaced in order to provide for the projection of lights of three colors;

Fig. 3 is a view illustrating a modification of my invention in which an additional source of light is so arranged as to increase the brilliancy of the projected beam of light;

Fig. 4 is a view similar to Fig. 2 but showing the angular disposition of the elements of Fig. 3;

Fig. 5 is a view illustrating a scheme in which uncolored concentrating lenses are used, and in which the color effects are produced by colored slides or disks.

Fig. 6 is a view showing the angular arrangement of lenses for use in projecting light of four colors;

Fig. 7 is a view showing how both the concentrating and projecting lenses may be arranged all upon the same side of the light intercepting screen, instead of on opposite sides thereof;

Fig. 8 is a view showing the elements present in the arrangement shown in Fig. 7, as seen from a position to the left of said figure;

Fig. 9 is a view illustrating in a conventional manner the way in which the several elements employed in my invention are supported in proper relation within a suitable casing, this view being a section taken upon longitudinal planes indicated by the broken line 9—9, Fig. 10;

Fig. 10 is a view showing a section taken upon a transverse plane indicated by the line 10—10, Fig. 9;

Fig. 11 is a view illustrating a modification in which the light compartments are arranged one above another, instead of angularly as in Figs. 9 and 10, this view being taken upon a longitudinal plane indicated by the line 11—11, Fig. 12;

Fig. 12 is a view showing a section taken upon a transverse plane indicated by the line 12—12, Fig. 11;

Fig. 13 is a view illustrating a modified arrangement in which two colored lenses are arranged up one side, and one upon the other, of the light intercepting screen, this view being taken upon a longitudinal plane indicated by the line 13—13, Fig. 14;

Fig. 14 is a view showing a section taken upon a transverse plane indicated by the line 14—14, Fig. 13;

Fig. 15 is a view illustrating a slightly different form of casing, and showing the colored lenses arranged all upon one side of the light intercepting screen, the view being taken upon longitudinal planes indicated by the broken line 15—15, Fig. 16, and;

Fig. 16 is a view showing a section taken upon a transverse plane indicated by the line 16—16, Fig. 15.

Referring to the drawings, Figs. 1 to 8 inclusive are in the nature of diagrams employed to illustrate the optical principles of my invention, while Figs. 9 to 16 are views showing some of the various ways in which my invention may be put into practice, and rendered available for use in and as a part of a signaling system for use upon railways, as above explained.

In Figs. 1 and 2 the reference numerals 20, 21, and 22 designate red, green, and yellow lenses angularly spaced with reference to the axis A—B of the system, as shown in Fig. 2, and so located and arranged relative to a translucent screen 23 that light emanating from three sources of light such as incandescent electric lights 24, 25, (two only appearing in Fig. 1, although one is associated with each of the three lenses) will be concentrated at one and the same place thereupon; the lights being located, approximately, one at one of the conjugate foci of each lens, while the other foci of the lenses are at a common point adjacent the intercepting screen 23 made of ground glass or other suitable material. This screen is shown as a plane flat piece of glass or similar material, although it may be curved or of other form, if desired; and it will in practice be so located as to be somewhat out of focus, so that a spot of light of some little area will be produced thereupon by the lenses, as will be appreciated. Located upon the side of the screen 23 opposite to that of the lenses above referred to is an objective lens 26 made of clear glass, and uncolored, which lens is so located that light emanating from the screen 23 as a secondary source of light will be concentrated and projected as a beam made up of parallel or slightly diverging rays, as is desirable in a signaling system.

The several incandescent lamps together with the colored lenses associated with them thus form a plurality of sources of light each of a distinctive color dependent upon the color of the lenses associated with the lights, while the translucent screen is illuminated by said primary sources and becomes a secondary source of colored light which is projected unchanged through the uncolored objective lens 26.

It will be appreciated that if more than one of the primary sources is illuminated at the same time, the color of the light emanating from the screen and passing through the lens 26 will be a resultant color due to a blending of the colors of the primary sources lighted and in operation at the time. In a railway signaling system, however, it is necessary to display signal lights of distinctive and widely variant colors, to which end my invention includes means, shown conventionally as the switches 27, for controlling the primary sources of light so that one only of them may be in operation or illuminated at a time. Under such conditions it will be obvious that if the light 24 only, for example, is illuminated, red light will be concentrated upon the screen 23 by the red lens 20, and a red beam will be projected by the lens 26; and likewise a green, or a yellow beam, when the light 25, or the light (not shown, but associated with the yellow lens 22), is lighted.

When my invention is used in connection with and as a part of a block signal system upon a railway the switches 27, (or other device whereby the lamps are controlled, so that light of one color only will be projected at a given time to form a visible signal light) will be operated and controlled by suitable electrical, mechanical, pneumatic or other mechanism, the same, generally speaking, as the signal lights are controlled in block signal systems at present in use. This present invention, however, has to do only with the means for producing properly colored visible signals using lamps of any kind or type as ultimate sources of light; and the means for controlling the lamps employed so as to produce changes in color of the light emitted, as is required in block signal systems, forms no part of the invention to which this application relates.

Figs. 3 and 4 illustrate the elements and features of arrangement and operation present in Figs. 1 and 2, and, in addition, show how the brilliancy of the illumination upon the screen 23 may be enhanced by means of a source of light independent of the primary sources which determine the color of the signal lights displayed.

In the scheme illustrated in these figures the reference numeral 28 designates a source of light independent of the primary sources 24, 25, while 29 designates a lens or equivalent device adapted to concentrate the rays emanating therefrom upon the intercepting translucent screen 23, at the same place that the light from the several sources of colored light is concentrated thereupon by the colored lenses, whereby the brilliancy of the light emanating from the screen will be enhanced and said screen will thus become a more intensely illuminated secondary source of light and brighter signal lights will be projected by the lens 26.

The purpose of the auxiliary source of light 28 is to produce signals which will be the better seen and recognized by the engineer. This light may be lighted and in operation all the time, in which case its rays are added to whichever color of light is being projected by the lens 26; or it may be used to reinforce those colors of light which are difficult to see and recognize, and omitted when an easily seen and recognized color is being displayed. Finally, the character of this auxiliary light will depend upon the end to be attained; for example, if brilliancy of illumination is the end in view, the light would be as near as practical colorless, or so called white light; while if the reinforcement of some particular color or colors is desired the arrangement will be such that the rays projected onto the screen will be such as to have an additive effect when light of the color or colors to be reinforced is being projected from the screen.

Figs. 5 and 6 illustrate an arrangement in which four primary sources of light are provided, and in which the color effects are produced by colored slides or disks. In this form and arrangement the projecting lenses 30, 31, 32 and 33, are or may be made of uncolored glass, each having a lamp associated with it although two only of such lamps are shown at 34, 35. In this arrangement the color effects are produced by stationary colored slides or disks 36, 37, arranged adjacent and either upon one or both sides of the lenses; which is a means for producing colored light which may obviously be used in any of the embodiments of my invention herein disclosed.

Figs. 7 and 8 illustrate an arrangement for displaying lights of three colors as in Figs. 1 to 4, but in which the projecting lenses 38, 39, 40 and the objective lens 41 are located all upon the same side of the intercepting screen 42, which screen may in this case be advantageously provided with a reflecting surface or back 43, as no light passes through the screen in this arrangement. Light from the lamps 44, 45, and from another not shown, is concentrated upon the screen, reflected therefrom, and projected through and by the lens 41, as will be understood; the same ultimate effect being attained as in the forms of my invention heretofore explained.

These figures also illustrate how some of the color effects may be produced by means of colored lenses, and others by the use of colored disks or slides 46 used in connection with uncolored lenses; and illustrate also the use of reflectors 47 back of the lamps, which reflectors may obviously be used in any of the various forms hereinbefore described. Finally, while I have referred to incandescent electric lamps as the ultimate sources of light, it will be understood that any kind of lamps or illuminating element or device may be employed as the light giving element of the several primary sources of colored light.

It will be appreciated that in order to adapt my invention, the principles of which have been explained by means of the diagrams appearing in Figs. 1 to 8, for use in a railway signaling system, the various elements must be so arranged that the light from each of the primary sources cannot interfere with light from another, and so arranged that light from an external source cannot interfere with the light emanating from the primary sources of colored light, to which end the various elements are located and held in proper position relative to one another within a suitable casing having separate compartments for the various lamps; various conventional forms of which casings are illustrated in Figs. 9 to 16 of the drawings.

Figs. 9 and 10 illustrate a form of casing having sides 48 and the rear portion of which is separated from the front portion by a partition 49 which serves as a support for the three colored lenses 50; the said rear portion being in turn provided with three partitions 51 extending longitudinally of the casing and dividing said rear portion into three angularly disposed chambers 52, 53, 54 within which are located the incandescent electric lamps 55, 56, 57, one back of each of the colored lenses, as will be appreciated.

The rear end of the casing is closed by means of a wall 58, and suitable doors will be provided for gaining access to the interior thereof; and the front of the casing is provided with a support 59 for the uncolored objective lens 60 of my device; which is here shown as of the stepped form in common use in railway signal lights, it being appreciated that any of the various and well known forms of lenses in common use may be used wherever a lens is used in my system.

Located between the partition 49 and the objective lens 60 is a diaphragm 61 which serves as a support for the translucent light intercepting screen 62 and, from the above explanation of the diagram shown in Fig. 1, it will be appreciated that when one of the lamps 55, 56, 57, is lighted, light corresponding with the color of the lens in front of the light in question will be concentrated upon the screen 62; from which screen as a secondary source light of the color of the lens in front of the lamp which is lighted will pass through and be projected by the objective lens 60.

Figs. 11 and 12 show a form of casing in which the lamps are located in chambers or compartments 63, 64, 65, arranged one above the other and separated by partitions 66, 67, extending longitudinally of the casing; light from the lamps 68 passing through the colored lenses 69 and onto the screen 70, and therefrom through the objective lens 71 in a way which will be obvious from the foregoing description of Figs. 9 and 10.

Figs. 13 and 14 illustrate an arrangement in which two lamps 72, 73, which, in connection with colored lenses 74, 75, serve as primary sources of two colors of light are placed in compartments 76, 77 at one end of the casing 78; while a third lamp 79 in connection with a third colored lens 80 is arranged at the other end of the casing; whereby the translucent screen 81 is illuminated from sources of colored light located some upon one and some upon the other side thereof. The screen thus becomes a secondary source in the same sense as in the forms hereinbefore explained, and light therefrom passes through the objective lens 82, as will be appreciated.

Figs. 15 and 16 illustrate an arrangement in which the colored concentrating lenses, as well as the uncolored objective lens, are all located upon the same side of the screen, as in the diagram shown in Figs. 7 and 8, so that the screen may also act as a reflector, as explained. In this form the lamps 83 are located in angularly disposed compartments 84, and their light is concentrated upon the screen 85; from which it is reflected and passes through the objective lens 86, as will be understood.

It will be appreciated that the colored projecting lenses will be of such focal length, and will be so arranged, supported and spaced, that light from the lamps will be concentrated at one and the same place upon the light intercepting screen; and that the objective lens will be of such focal length and so arranged that the beam of light projected will, as far as practical, be made up of parallel or approximately parallel rays.

Having thus described and explained my invention, I claim and desire to secure by Letters Patent:

1. In a device of the class described, a plurality of sources of light differing in color from one another; means for controlling said sources so that light may emanate from one only of them at a time; a light intercepting member so located as to be illuminated by any one of said sources and to thereby become and serve as a secondary source of light the color of which will depend upon which one of said sources is in operation; and an uncolored lens spaced apart from said light intercepting member and through which light is projected from said member as a secondary source of light.

2. In a device of the class described, a plurality of primary sources of light; a plurality of members differing in color from one another and one of which members is associated with each of said sources; a screen so located as to be illuminated by light emanating from said primary sources and passing through the colored members associated therewith, whereby said screen becomes a secondary source of light; and an uncolored lens spaced apart from said screen and through which light is projected from said screen as a secondary source of light.

3. In a device of the class described, a plurality of primary sources of light; a plurality of members differing in color from one another and one of which members is associated with each of said sources; means for controlling said primary sources so that light may emanate from one only of them at a time; a screen so located as to be illuminated by light emanating from any one of said primary sources and passing through the colored member associated therewith, whereby said screen becomes a secondary source of light the color of which will depend upon which one of said primary sources is in operation; and an uncolored lens spaced apart from said screen a distance corresponding with its focal length and through which lens light is projected from said screen as a secondary source of light.

4. In a device of the class described, a plurality of primary sources of light; a screen adapted to form a secondary source of light; a plurality of lenses, one associated with each of said sources, said lenses differing in color from one another and their arrangement being such that light emanating from said several primary sources will pass through said lenses and be concentrated upon said screen; means for controlling said primary sources so that light may emanate from one only of them at a time; and an uncolored lens spaced apart from said screen a distance corresponding with its focal length, and through which lens light is projected from said screen as a secondary source of light.

5. In a device of the class described, a screen adapted to form a secondary source of light; a plurality of primary sources of light located all upon one side of said screen; a plurality of lenses, one associated with each of said sources, said lenses differing in color from one another and a lens being located between each primary source of light and said screen so that light emanating from said several primary sources will pass through said lenses and be concentrated upon said screen; means for controlling said primary sources so that light may emanate from one only of them at a time; and an uncolored lens located upon the side of said screen opposite to that occupied by said primary sources of light, said lens being spaced apart from said screen a distance corresponding with its focal length and through which lens light is projected from said screen as a secondary source of light.

6. In a device of the class described, a plurality of sources of light differing in color from one another; means for controlling said sources so that light may emanate from one only of them at a time; a light intercepting member so located that light emanating from any one of said sources will be focused thereupon, whereby said member becomes a secondary source of light the color of which will depend upon which one of said sources is in operation; and means spaced apart from said light intercepting member for projecting light emanating from said member as a secondary source of light.

7. In a device of the class described, a plurality of primary sources of light; a plurality of members differing in color from one another and associated with said sources; a screen so located as to be illuminated by light emanating from said primary sources and passing through said colored members, whereby said screen becomes a secondary source of light; and an uncolored lens the focus of which is at said screen, and through which lens light emanating from said screen as a secondary source of light is projected.

8. In a device of the class described, a plurality of primary sources of light; a plurality of members differing in color from one another and associated with said sources; a screen so located as to be illuminated by light emanating from said primary sources and passing through said colored members, whereby said screen becomes a secondary source of light; a source of light independent of said primary sources and so arranged as to illuminate said screen; and an uncolored lens spaced apart from said screen and through which light is projected from said screen as a secondary source of light.

9. In a device of the class described, a plurality of primary sources of light; a screen adapted to form a secondary source of light; a plurality of lenses, one associated with each of said sources, said lenses differing in color from one another and their arrangement being such that light emanating from said several primary sources will pass through said lenses and be concentrated upon said screen; means for controlling said primary sources so that light may emanate from one only of them at a time; a source of light independent of said primary sources and so arranged as to illuminate said screen; and an uncolored lens spaced apart from said screen a distance corresponding with its focal length and through which lens light is projected from said screen as a secondary source of light.

10. In a device of the class described, a suitable casing; means for dividing the interior of said casing so as to provide a plurality of separate lamp compartments; colored members associated with said lamp compartments whereby the color of the light emanating therefrom is determined; a light intercepting screen so arranged that light emanating from said compartments will be focused thereupon; and an uncolored lens supported by said casing and spaced apart from said screen and through which light from said screen as a secondary source passes from said casing.

11. In a device of the class described a suitable casing; means for dividing the interior of said casing so as to provide a plurality of lamp compartments; means associated with each of said lamp compartments for determining the color of light emanating therefrom; means for controlling said lamps so that one only of them may be in operation at a time; a light intercepting screen upon which light emanating from said lamp compartments is concentrated; and an uncolored lens supported by said casing and spaced apart from said screen a distance corresponding with its focal length, and through which lens light is projected from said screen as a secondary source of light.

12. In a device of the class described, a suitable casing; a light intercepting screen located within said casing; means for dividing the interior of said casing so as to provide a plurality of separate lamp compartments; means for controlling said lamps so that one only of them may be in operation at a time; a plurality of colored lenses, one associated with each of said lamp compartments, and which lenses are adapted to concentrate the light emanating from said lamps upon said screen; and an uncolored lens supported by said casing and spaced apart from said screen a distance corresponding with its focal length, and through which lens light is projected from said screen as a secondary source of light.

In testimony whereof I have signed my name to this specification this 25th day of September, 1916.

GILBERT C. WHITNEY.